United States Patent
Ding et al.

(10) Patent No.: US 7,924,760 B2
(45) Date of Patent: Apr. 12, 2011

(54) METHOD FOR ACQUIRING MULTIMEDIA BROADCAST/MULTICAST SERVICE ACCESS INFORMATION

(75) Inventors: Yingzhe Ding, Shenzhen (CN); Yanhong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 955 days.

(21) Appl. No.: 11/736,309

(22) Filed: Apr. 17, 2007

(65) Prior Publication Data

US 2008/0049682 A1 Feb. 28, 2008

Related U.S. Application Data

(63) Continuation of application No. PCT/CN2005/001833, filed on Nov. 2, 2005.

(30) Foreign Application Priority Data

Nov. 11, 2004 (CN) .......................... 2004 1 0090996

(51) Int. Cl.
*H04H 20/71* (2008.01)
(52) U.S. Cl. ........ 370/312; 370/329; 370/337; 370/342; 370/349; 455/3.061; 455/414.1; 455/445; 455/458; 455/461
(58) Field of Classification Search .................. 455/3.06, 455/414.1, 414.2, 414.3, 445, 450, 458, 461; 370/312, 329, 337, 342, 349, 390, 432, 437, 370/469
See application file for complete search history.

(56) References Cited

U.S. PATENT DOCUMENTS

| 2003/0194992 | A1 | 10/2003 | Kim et al. | |
|---|---|---|---|---|
| 2003/0224794 | A1 | 12/2003 | Kim et al. | |
| 2004/0202140 | A1 * | 10/2004 | Kim et al. | 370/335 |
| 2005/0009527 | A1 * | 1/2005 | Sharma | 455/445 |
| 2005/0255886 | A1 * | 11/2005 | Aaltonen et al. | 455/558 |
| 2006/0040655 | A1 * | 2/2006 | Kim | 455/426.1 |
| 2006/0077289 | A1 * | 4/2006 | Lee et al. | 348/441 |
| 2006/0252439 | A1 * | 11/2006 | Cai | 455/515 |
| 2009/0207774 | A1 * | 8/2009 | Lee et al. | 370/312 |

FOREIGN PATENT DOCUMENTS

| CN | 1297109 A | 5/2001 |
|---|---|---|
| CN | 1463103 A | 12/2003 |
| CN | 1487756 A | 4/2004 |
| CN | 1499759 A | 5/2004 |

(Continued)

OTHER PUBLICATIONS

Search Report from Canadian Intellectual Property Office dated Jun. 1, 2007 (3 pp).

(Continued)

*Primary Examiner* — Dwayne D Bost
*Assistant Examiner* — Inder P Mehra
(74) *Attorney, Agent, or Firm* — Marshall, Gerstein & Borun LLP

(57) ABSTRACT

The invention discloses a method for acquiring MBMS access information comprising: in a modification period, upon receiving an MBMS access information message transmitted from a network a UE initiating a corresponding procedure according to its state; if completing the corresponding procedure successfully, the UE stopping receiving a further MBMS access information messages; if not completing the corresponding procedure successfully the UE continuing acquiring further MBMS access information messages. The method facilitates the UE to automatically control MBMS access information acquiring procedure, and further reduces energy consumption of the UE to the maximum extent.

6 Claims, 5 Drawing Sheets

FOREIGN PATENT DOCUMENTS

| | | |
|---|---|---|
| CN | 1534913 A | 10/2004 |
| EP | 1475976 | 11/2004 |
| KR | 10-2004-0041289 | 5/2004 |

OTHER PUBLICATIONS

3GPP, "3rd Generation Partnership Project; Technical Specification Group Radio Access Network; Introduction of the Multimedia Broadcast Multicast Service (MBMS) in the Radio Access Network (RAN); Stage 2 (Release 6)," 3GPP TS 25.346 V61.0 (2004).

International Search Report for Application No. PCT/CN2005/001833, dated Jan. 5, 2006.

Written Opinion for Application No. PCT/CN2005/001833, dated Dec. 20, 2005.

3GPP™, "Universal Mobile Telecommunications Systems (UMTS); Introductiong of Multimedia Broadcast/Multicast Service (MBMS) in the Radio Access Network (RAN); Stage 2 (3GPP TS 25.346 version 6.2.0 Release 6)," ETSI TS 125 346 v6.2.0 (2004).

Tdoc R2-041953, "Introducing MBMS in RRC, draft CR," 3GPP TSG-RAN2 Meeting #44 (2004).

European Search Report for Application No. 05806966.7-2412, dated Nov. 26, 2010.

* cited by examiner

METHOD FOR ACQUIRING MULTIMEDIA BROADCAST/MULTICAST SERVICE ACCESS INFORMATION

CROSS REFERENCE TO RELATED APPLICATIONS

This is a continuation of International Application No. PCT/CN2005/00,1,833, filed Nov. 2, 2005, which claims the benefit of Chinese Patent Application No. 20041009099.6, filed Nov. 11, 2004, the entire respective disclosures of which are hereby incorporated herein by reference.

BACKGROUND OF THE INVENTION

The invention generally relates to information acquiring technique, more particularly to a method for acquiring Multimedia Broadcast/Multicast Service (MBMS) access information.

Field of the Technology

Development of the third generation mobile communication technology makes people less and less satisfied with simple voice services in mobile communication, for the reason that the third generation mobile communication can provide services with higher data transferring speed than the second generation mobile communication does, many new multimedia services appeared, such as video telephone, picture download and high speed Internet browsing etc. Wherein, some applications such as video on demand, television broadcasting, video conference, online education and interactive games etc. require that a plurality of user equipment (UE) can receive the identical data simultaneously.

In order to make full use of mobile communication network resources, the third mobile communication introduced the concept of multicast and broadcast. Multicast and broadcast is the technique for transferring data from one data source to multiple targets. Specifically the International Organization for Standardization of WCDMA/GSM (3GPP) introduces Multimedia Broadcast/ Multicast Service (MBMS), defines MBMS as Point to Multiple Point (PTM) service that transferring data from a data source to multiple targets in mobile communication networks, to share network resources and increase utilization ratio of network resources, especially idle interface resources. The MBMS defined by 3GPP cannot only implement multicast and broadcast of low speed messages such as plain text, but also multicast and broadcast of high speed multimedia services.

FIG. 1 is a schematic diagram illustrating architecture of radio network that supports Broadcast/Multicast service, as shown in FIG. 1, in prior 3GPP, entity of the radio network supporting Broadcast/Multicast service is Broadcast/Multicast service server (BM-SC) 101, and BM-SC 101 connects with Traffic Plane Function (TPF) Gateway GPRS Support Node (GGSN) 102 via Gmb interface or Gi interface, one BM-SC 101 can connect with multiple TPF GGSN 102; TPF GGSN 102 further connects with Serving GPRS Support Node (SGSN) 103 via Gn/Gp interface, one GGSN 102 can connect multiple SGSN 103; SGSN 103 can connect Universal Terrestrial Radio Access Network (UTRAN) 104 of Universal Mobile Telecommunication System (UMTS) via Iu interface, and then UTRAN 104 connects User Equipment (UE) 106 via Uu interface, SGSN 103 can also connect with GSM/EDGE Radio Access Network (GERAN) 105 of Global System of Mobile communication (GSM) via Iu/Gb interface, and GERAN 105 further connects UE 107 via Um interface. Wherein, both GGSN and SGSN are nodes of Core Network (CN) in radio network.

From the network structure shown in FIG. 1, it can be seen that, in order to support MBMS service, Broadcast/Multicast service center, i.e. BM-SC, the mobile network function entity is introduced in the third generation mobile communication system, the BM-SC is the entrance to content providers, which can be used for authorizing and initiating MBMS bearer service in mobile networks as well as transferring MBMS contents based on preset schedules. Besides, the functions related to MBMS also are added to function entities such as UE, UTRAN, GERAN, SGSN and GGSN etc.

MBMS consists of multicast mode aid broadcast mode, wherein, multicast mode requires UE to subscribe in relevant Multicast group to activate services and generate corresponding charge information. The difference between multicast mode and broadcast mode in service requirement results in different operation flow between the two modes, as shown in FIG. 2 and FIG. 3. FIG. 2 is a schematic flowchart illustrating operation in MBMS Multicast mode, while FIG. 3 is a schematic flowchart illustrating operation in MBMS Broadcast mode.

As shown in FIG. 2, the procedure involved in MBMS Multicast service comprises: Subscription, Service announcement, Joining, Session Start, MBMS notification, Data transfer, Session Stop and Leaving. Wherein, during Subscription step, the UE can subscribe wanted MBMS services; during Service announcement step, BM-SC may announce currently available services; Joining step is the MBMS multicast service activating procedure, during the joining step, UE informs the network which is able to be a member of current multicast group and accepts multicast data of corresponding services, the joining step will generate contexts of MBMS UE in the network and UE that joined the multicast group to record UE information during Session Start step, BM-SC will prepare to transfer data, notify the network to establish bearer resource of relevant Core Network and access network; during MBMS notification step, the UE will be notified that MBMS multicast session will start soon; during Data transfer step, BM-SC transfers data to the UE through bearer resource established in Session Start step, MBMS service has two modes when transferring between UTRAN and UE: Point To Multipoint (PTM) mode and Point To Point (PTP) mode, wherein, PTM mode means that identical data will be transferred through PTM Traffic channel (MTCH) logical channels, and available to all UEs that subscribe to Multicast service or are interested in Broadcast service, while PTP mode means the data is transferred via Dedicated traffic channel (DTCH) logical channels and available only to one corresponding UE; in Session Stop step, bearer resource established in Session Start step will be freed; and subscribers in the group will leave the multicast group in the Leaving step, which means that the UE will not receive Multicast data anymore, and the corresponding MBMS UE contexts will also be deleted in the step.

As shown in FIG. 3, procedure involved in MBMS Broadcast service are similar to these of MBMS Multicast service, however, it is unnecessary to implement Subscription procedure and Joining procedure before Session Start step, and also unnecessary to implement leaving step after Session Stop step.

In Data transfer steps of Multicast mode service and Broadcast mode service, MBMS service has two modes for transferring information between UTRAN and UE: Point to Multipoint (PTM) mode and Point to Point (PTP) mode. Wherein, PTM mode means that identical data is transferred through MTCH of MBMS, and available to all UEs that subscribed to Multicast service or are interested in Broadcast service; while PTP mode means data is transferred via DTCH and available only to one corresponding UE.

As to PTM transfer mode of MBMS, relevant radio control information comprises service information, access information, radio bearer information and Frequency Layer Convergence (FLC) information etc., and Radio Resource Control (RRC) transfers all these information through logical channels such as MBMS PTM Control Channel (MCCH). MCCH information is transferred based on fixed scheduling means, and meanwhile, UTRAN will repeat MCCH information to improve reliability. FIG. 4 is a schematic diagram illustrating scheduling of MCCH information transfer, as shown in FIG. 4, all square blocks in the figure are MCCH information, the cycle for sending MCCH information is repetition period, the whole MCCH information will be transferred periodically in the repetition period; modification period is defined as the integral multiple of repetition period, MCCH information will be modified in each modification period; access information of the MBMS can be transferred periodically in period of access information, moreover, access information cycle is integral division of the repetition period, MCCH information can be further divided into Critical information (Critical Info) and Uncritical Information, wherein, Critical In formation comprises MBMS neighbor cell information, MBMS service information and MBMS radio bearer information, and it is the information that needs to be transferred repeatedly and periodically, moreover, the content transferred in each repetition period are just the same, MCCH information can only be modified when it is transferred at first time in modification period; while Uncritical Information refers to MBMS access information, which is the information that need not to be transferred repeatedly and periodically and can be modified at any time. In FIG. 4, the solid square blocks are Uncritical Information, while the hollow square blocks refers to Critical Information, and the blocks filled with bias and backlash indicate Uncritical Information and Critical Information with modified contents respectively.

In current Mobile Communication system, according to whether RRC connection has been established in current mobile communication system, the state of the UE can be classified into idle mode and RRC Connected mode. Wherein, the UE that has not established RRC connection with UTRAN equipment stays is in idle mode, where, the UE can only be distinguished through identifier of Non-Access Stadium (NAS) such as International mobile subscriber identity (IMSI); and the UE that has established RRC connection with UTRAN equipment stays is in RRC Connected mode, where, a Radio Network Temporary Identity (RNTI) has been assigned for the UE to act as identity identifier of the UE in common transport channel.

Moreover, the UE in RRC Connected mode can be further classified into different states according to layer of RRC connection and type of transport channels used by the UE: CELL_PCH state, CELL_FACH state, CELL_DCH state and URA_PCH state, wherein, the UE in first three states can be identified on the cell layer, while the UE in URA_PCH state can be identified on UTRAN Registration Area (URA) layer. A dedicated physical channel will be assigned for the UE in CELL_DCH state, therefore, the UE can use the dedicated transport channel or shared channel or their combination. The UE in CELL_FACH state needs downlink to continuously monitor a common transport channel (Forward Access Channel (FACH)), and uplink to assign random common channel (Random Access Channel (RACH)). The UE in CELL_PCH and URA_PCH state adopts Discontinuous Reception (DRX) means to monitor a Paging Channel (PCH) through relevant Paging Indicator Channel (PICH) channels, however, there are no uplink movement in these two states.

In MBMS system, in order to determine optimum transport mode for each assigned MBMS service, MBMS counting procedure is introduced, and the MBMS counting procedure is initiated by RNC. In the MBMS counting procedure, the UE in idle mode and URA_PCH state should acquire MBMS control information sent from the RNC, and the MBMS control information is the access information mentioned above. Specifically speaking, when a service Session Start step needs establishing radio bearer and the RNC considers it necessary, the RNC will issue notification messages and send probability factor through the access information simultaneously. Upon receiving the notification messages, the UE in idle mode may acquire access information, and initiate the RRC connection setup procedure to respond counting procedure if probability factor check is passed; while the UE in URA_PCH state will acquire access information upon receiving the notification messages, and initiate cell update procedure to respond counting procedure if probability factor check is passed. However, the passing probability factor check means UE will generate a random number uniformly distributed within [0, 1] upon receiving the access message, if the random number satisfies the assigned initiating condition upon comparing with probability factor in the access message, then initiate corresponding procedure and consider the probability factor checking procedure passed. However, the assigned initiating condition can be that the generated random number is greater than the probability factor comprised in the MBMS access information; or the generated random number is less than the probability factor comprised in the MBMS access information.

The means for sending probability factor mentioned above is shown in FIG. 5, the RNC issues probability factors such as PF0, PF1 and PF2 etc. to UE through access information in each period of access information, and probability factors in each period of access information can be modified, which means probability factors are variable. Once the counting procedure of one MBMS service is finished, the access information, such as probability factor of corresponding MBMS service, should be deleted from the access information issued currently. For instance: in FIG. 5, rectangular block 50, 51 and 52 respectively represents different access information with MBMS service probability factors, wherein, probability factor carried by rectangular block 50 is PF0, probability factor carried by rectangular block 51 is PF1 and probability factor carried by rectangular block 52 is PF2, in this case, if the probability factor is PF2, then counting procedure of MBMS service A will be finished, and the access information corresponding to rectangular block 53 will no longer carry probability factor and relevant access information of MBMS service A, of course, rectangular block 53 can carry probability factors and relevant access information of other MBMS services.

In the MBMS service counting procedure, if the UE checks that there is no probability factor of the activated MBMS service in the access information, the UE will stop acquiring access information except receiving notification sent from the RNC once again. Besides, when a modification period ends, then the UE will also stop acquiring access information except RNC instructing the UE to continue acquiring access information in next modification period. In other words, the prior procedure is as follows: in one modification period, upon successfully responding counting instruction of the RNC, the UE in idle mode or URA_PCH state will keep acquiring access information till the case when the RNC no longer requires the UE to acquire access information of the activated MBMS service.

Actually, upon successfully responding the counting instruction of the RNC, as the access information of corresponding MBMS service becomes unnecessary for the UE, the UE in idle mode or URA_PCH state need not continue acquiring access information of the activated MBMS service in the modification period.

SUMMARY OF THE INVENTION

In view of the above, the invention is to provide a method for acquiring Multimedia Broadcast/Multicast Service access information in order to enable UE to automatically control MBMS access information acquiring procedure, and further reduce energy consumption of UE to the maximum extent.

The technical scheme according to an embodiment of the invention is implemented as follows:

A method for acquiring Multimedia Broadcast/ Multicast Service (MBMS) access information, including:

in a modification period, upon receiving an MBMS access information message transmitted from a network, a UE initiating a corresponding procedure according to its current state; and judging whether the corresponding procedure has been completed successfully, if yes, the UE stopping receiving the further MBMS access information message; if not, the UE continuing acquiring the further MBMS access information message.

Preferably, the MBMS access information message transmitted from network comprising a probability factor for the MBMS activated by the UE; before the UE initiating the corresponding procedure, further including.

upon receiving the MBMS access information message that comprises the probability factor, the UE generating a random number uniformly distributed within [0, 1]; and judging whether the generated random number satisfies an assigned initiating condition, upon comparing the number with the probability factor comprised in the MBMS access information message, if yes, the UE initiating the corresponding procedure according to its state, if not, continuing acquiring the further MBMS access information message in the modification period.

According to the method for acquiring MBMS access information provided by the invention, it is possible to enable the UE in idle mode or the UE in URA_PCH state to automatically control itself stopping acquiring the access information of relevant MBMS services in different steps based on the RRC connection setup procedure or cell update procedure, and thereby facilitate UE to stop acquiring the relevant MBMS service access information immediately or as early as possible when there is no need for the MBMS service access information, and decrease energy consumption incurred by the UE while acquiring MBMS service access information in largest extent.

Besides, the invention also provides multiple schemes and makes it possible to choose suitable schemes according to different cases, which brings more flexibility, more convenience and stronger applicability.

EMBODIMENTS OF THE DESCRIPTION

Embodiments of the invention is implemented as that: in a modification period, Once the UE acquiring MBMS access information in idle mode and URA_PCH state receives MBMS access information for certain MBMS service sent from the network such as RNC, and responds successfully, the UE can stop acquiring further MBMS access information for the MBMS service in the modification period.

As what the UE in idle mode needs to initiate is RRC connection setup procedure, and what the UE in URA_PCH state needs to initiate is cell update procedure, correspondingly, so the stopping acquiring MBMS access information can be implemented in different steps based on RRC connection setup and cell update procedure respectively.

Figure 1:
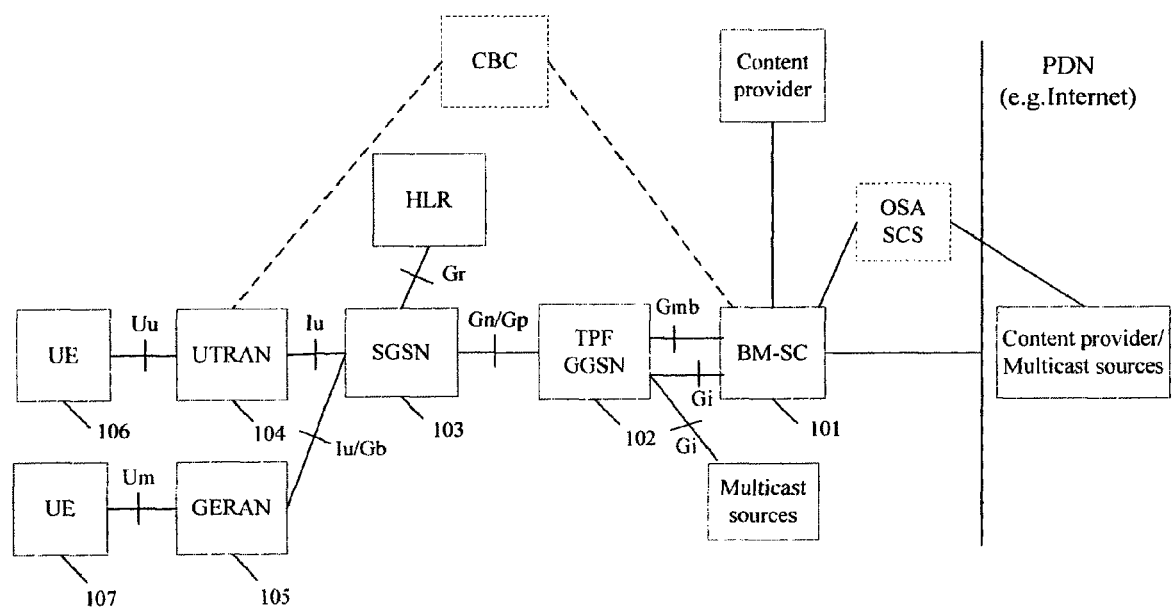
FIG. 1 is a schematic diagram illustrating architecture of radio network that supports Broadcast/Multicast service.
Figure 2:
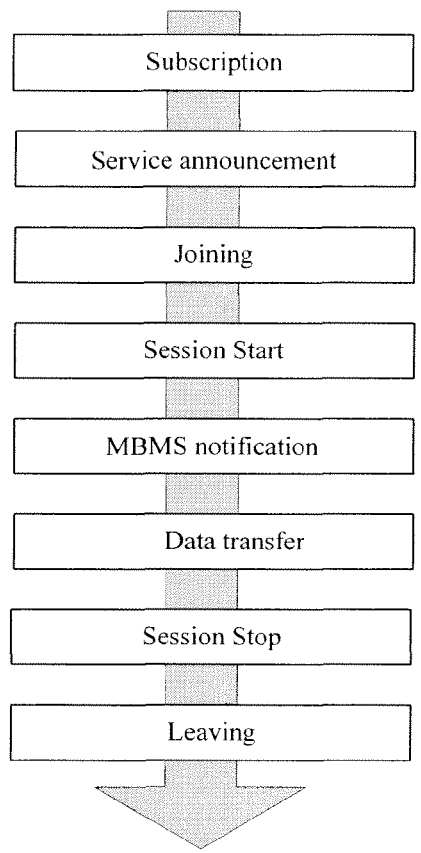
FIG. 2 is a schematic flowchart illustrating operation in MBMS Multicast mode.
Figure 3:
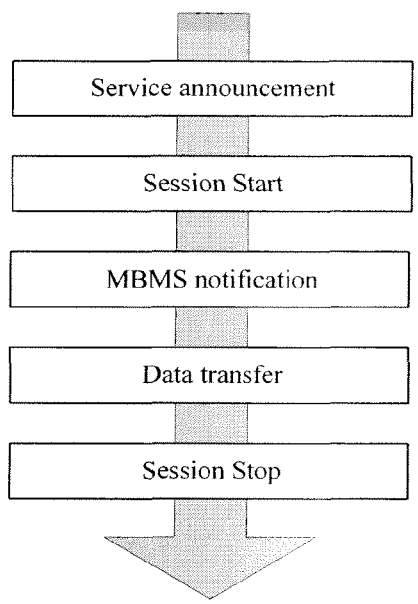
FIG. 3 is a schematic flowchart illustrating operation in MBMS Broadcast mode.
Figure 4:
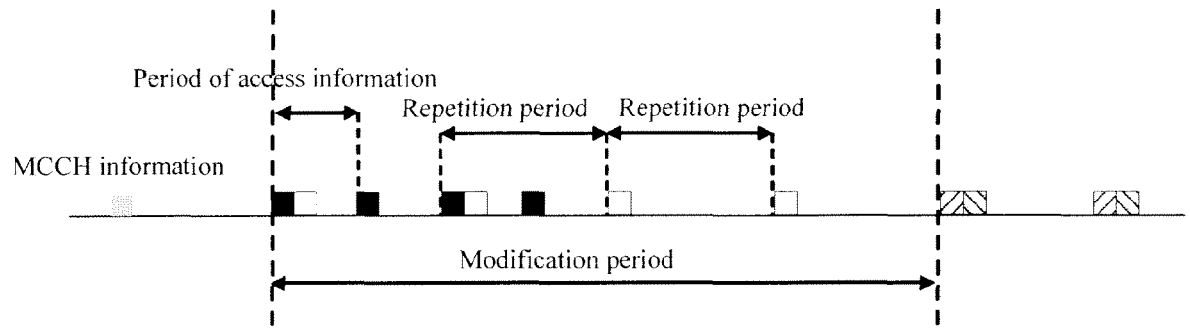
FIG. 4 is a schematic diagram illustrating scheduling of MCCH information transfer.
Figure 5:
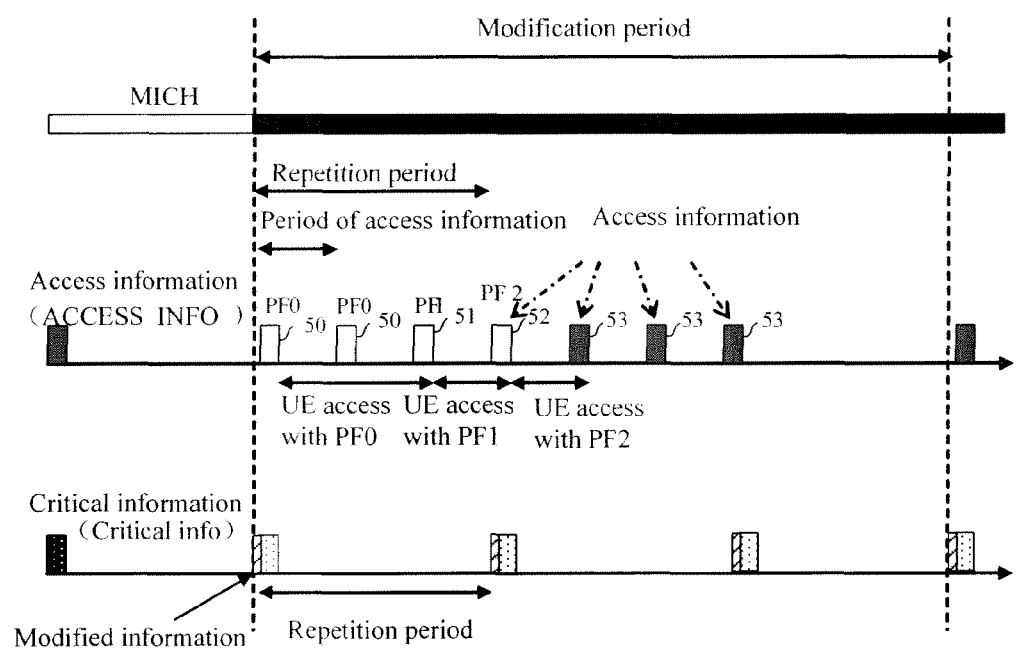
FIG. 5 is a schematic diagram illustrating means for sending probability factor.
Figure 6:
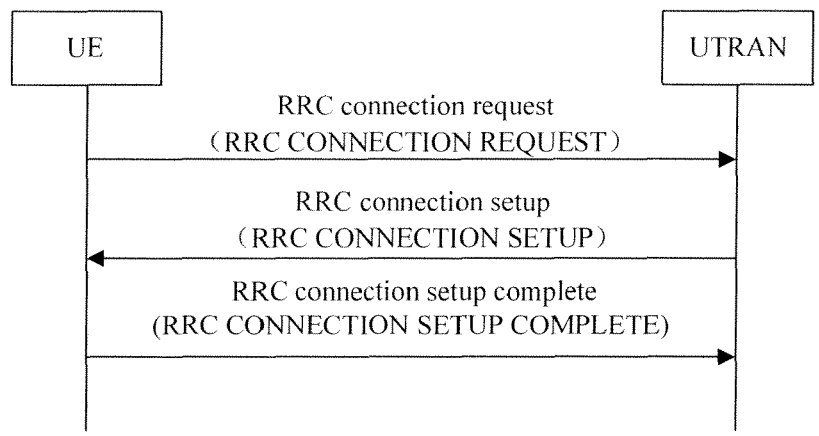
FIG. 6 is a schematic diagram illustrating RRC connection setup.

FIG. 6 is a schematic diagram illustrating RRC connection setup, As shown in FIG. 6, UE sending RRC connection request message RRC CONNECTION REQUEST to UTRAN, and initiating RRC connection setup procedure; upon receiving the request message, UTRAN establishing RRC connection, and returning RRC connection setup message RRC CONNECTION SETUP to the UE; upon receiving the message, the UE transferring into RRC connected mode, and then returning RRC connection setup complete message RRC CONNECTION SETUP COMPLETE.

Figure 7:
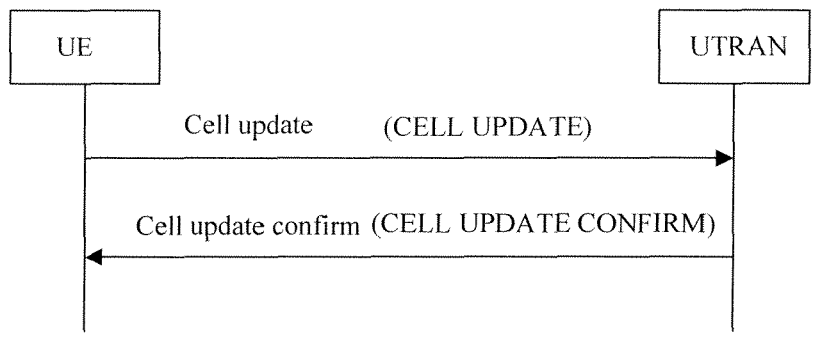
FIG. 7 is a schematic diagram illustrating cell update procedure.

FIG. 7 is a schematic diagram illustrating cell update procedure, UE sending cell update message CELL UPDATE to UTRAN, and initiating cell update procedure; upon receiving the update message, UTRAN returning cell update confirm message CELL UPDATE CONFIRM to the UE; upon receiving the confirm message, the UE completing its state transfer.

According to the above-mentioned RRC connection setup and cell update procedure, the stoppage of acquiring MBMS access information can be classified into tour cases:

The first case means: upon passing probability factor checking, and initiating RRC connection setup or cell update procedure, the UE stops receiving further MBMS access information in the current modification period. In this case, once the UE initiating RRC connection setup or cell update procedure, it will consider that the UE responds MBMS access information successfully.

The second case means: upon passing probability factor checking, initiating RRC connection setup or cell update procedure, and confirming that RRC connection setup request or cell update message has been sent successfully, the UE stops receiving further MBMS access information in the current modification period. In this case, once the UE confirms that RRC connection setup request or cell update message has been sent successfully, it will consider that the UE responds MBMS access information successfully.

The third case means: upon passing probability factor checking, initiating RRC connection setup or cell update procedure, and successfully receiving RRC connection setup message or cell update confirm message sent from the UTRAN, the UE stops receiving further MBMS access information in the current modification period. In this case, once the UE receives RRC connection setup or cell update confirm, it will consider that the UE responds MBMS access information successfully.

The fourth case means: upon passing probability factor checking, initiating RRC connection setup or cell update procedure, successfully receiving RRC connection setup message or cell update confirm message sent from UTRAN, and having successfully transferred into appointed mode or state according to instruction in the message, the UE stops receiving further MBMS access information in current modification period. In this case, once UE implements mode or state transfer successfully, it will consider that the UE responds MBMS access information successfully.

The implementing procedure of embodiments of the invention will be hereinafter described in detail with reference to the accompanying drawings and specific embodiments. In the following embodiments, passing probability factor checking means the assigned initiating condition is satisfied, i.e. it is allowable to initiate corresponding procedure. The assigned initiating condition can be that the generated random number is greater than the probability factor comprised in the MBMS access information-; or the generated random number is less than the probability factor comprised in the MBMS access information. However, all the following embodiments make the case when the generated random number is less than the probability factor comprised in the MBMS access information as the condition.

Embodiment One

Figure 8:
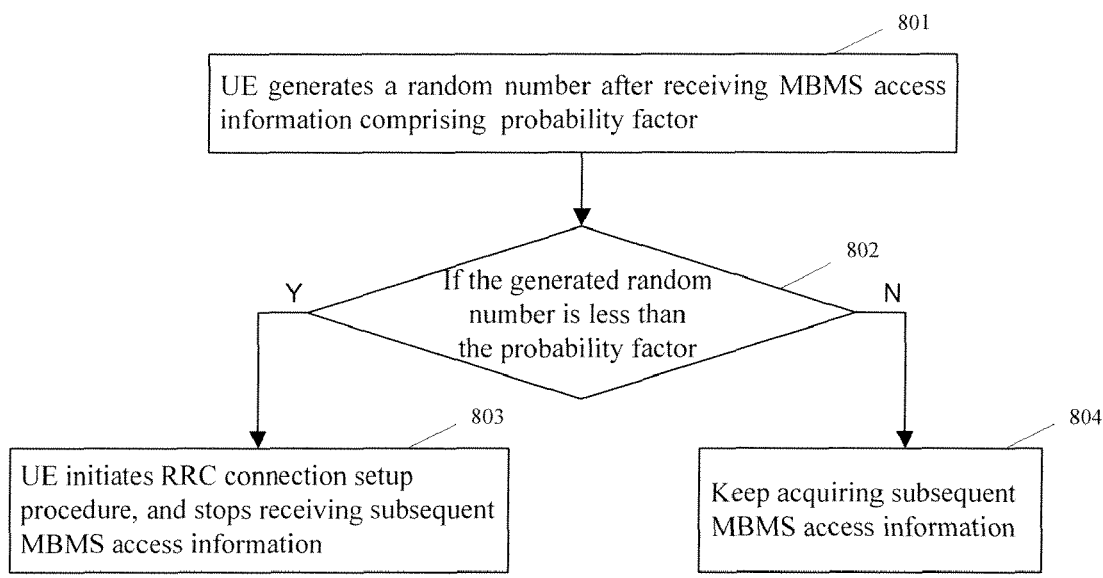
FIG. 8 is a schematic diagram illustrating implementing procedure of the UE in idle mode in accordance with an embodiment of the invention.
Figure 9:
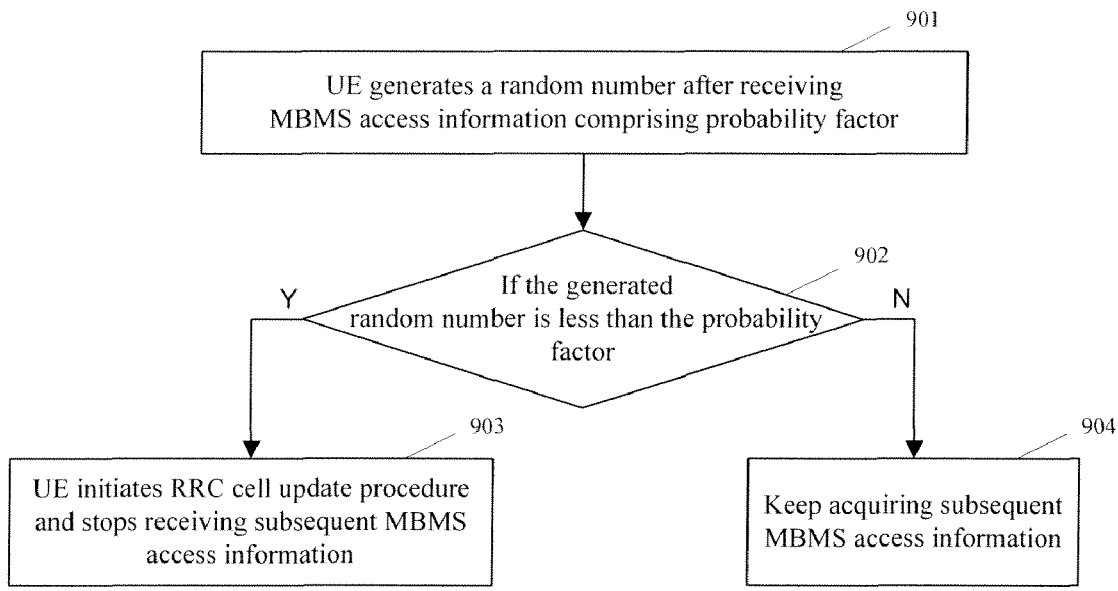
FIG. 9 is a schematic diagram illustrating implementing procedure of the UE in URA_PCH state in accordance with an embodiment of the invention.

In this embodiment, upon receiving an MBMS access information and passing probability factor checking of activated MBMS service in a modification period, the UE in idle mode initiates RRC connection setup procedure, and stops acquiring further MBMS access information in the modification period from the time when the UE initiating RRC connection setup procedure. In this embodiment, MBMS service A is the activated MBMS service. As shown in FIG. 8, the procedure of the UE in idle mode in this embodiment comprises following steps:

Step 801: upon receiving MBMS access information that is sent from the RNC and comprising probability factor for MBMS service A, the UE generates a random number uniformly distributed within [0, 1];

Step 802 to 804: the UE comparing and checking whether the random number generated in Step 801 is less than the probability factor comprised in MBMS access information, if yes, the UE initiates RRC connection setup procedure, i.e. sending RRC connection request to UTRAN, and then the UE stops receiving further MBMS access information in the modification period; otherwise, the UE continuing acquiring further MBMS access information in the modification period.

upon receiving certain MBMS access information and passing probability factor checking of activated MBMS service in a modification period, the UE in URA_PCH state initiates cell update procedure, and stops acquiring further MBMS access information in the modification period from the time when the UE initiating cell update procedure, As shown in FIG. 9, the procedure of the UE in URA_PCH state in this embodiment comprises the following steps:

Step 901: upon receiving MBMS access information that is sent from the RNC and comprises probability factor for MBMS service A, the UE generates a random number uniformly distributed within [0, 1];

Step 902 to 904: the UE comparing and checking whether the random number generated in Step 901 is less than the probability factor in MBMS access information, if yes, the UE initiates cell update procedure, i.e. sending cell update message to UTRAN, and then the UE stops receiving further MBMS access information in the modification period; otherwise, the UE continuing acquiring further MBMS access information in the modification period.

Embodiment Two

In this embodiment, upon receiving certain MBMS access information message and passing probability factor checking of activated MBMS service in a modification period, the UE in idle mode initiates setup procedure RRC connection, and then after confirming that RRC connection setup request has been sent successfully, the UP stops acquiring further MBMS access information in the modification period. Comparing the procedure of the UE in idle mode in embodiment two with those in embodiment one, the only difference is Step 803, where Step 803 changing to Step 803a:

Step 803a: if the random number generated in Step 801 is less than the probability factor comprised in MBMS access information, then the UE initiates RRC connection setup procedure, i.e. sending RRC connection request to UTRAN, and then, if the UE receives the instruction returned from its MAC layer indicating that RRC connection request has been sent successfully, the UE stops receiving further MBMS access information in the modification period; otherwise the UE has not received the instruction from MAC layer in preset time, then going to Step 804.

Upon receiving certain MBMS access information message and passing probability factor checking of activated MBMS service in a modification period, the UE in URA_PCH state initiates cell update procedure, and then upon confirming that cell update message has been sent successfully, the UE stops acquiring further MBMS access information in the modification period. Comparing the procedure of the UE in URA_PCH state in embodiment two with those in embodiment one, the only difference is Step 903, where Step 903 changing to Step 903a:

Step 903a: if the random number generated in Step 901 is less than the probability factor comprised in MBMS access information, the UE initiates cell update procedure, i.e. sending cell update message to UTRAN, and then, if the UE receives the instruction returned from its MAC layer indicating that cell update message has been sent successfully, the UE stops receiving further MBMS access information in the modification period; otherwise, the UE has not received the instruction from MAC layer in preset time, then going to Step 904.

Embodiment Three

In this embodiment, upon receiving certain MBMS access information message and passing probability factor checking of activated MBMS service in a modification period, the UE in idle mode initiating RRC connection setup procedure, and then upon receiving RRC connection setup message successfully, the UE stopping acquiring further MBMS access information in the modification period. Comparing the procedure of the UE in idle mode in embodiment three with those in embodiment one, the only difference is Step 803, where Step 803 changing to Step 803*b*:

Step 803*b*: if the random number generated in Step 801 is less than the probability factor comprised in MBMS access information, the UE initiating RRC connection setup procedure, i.e. the UE sending RRC connection request to UTRAN, aid then, if the UE receiving RRC connection setup message returned from UTRAN, the UE stopping receiving further MBMS access information in the modification period; otherwise, the UE has not received the RRC connection setup message from UTRAN in the preset time, then going to Step 804.

Upon receiving certain MBMS access information message and passing probability factor checking of activated MBMS service in a modification period, the UE in URA_PCH state initiates cell update procedure, and then upon receiving cell update confirm message, the UE stops acquiring further MBMS access information in the modification period. Comparing the procedure of the UE in URA_PCH state in embodiment three with those in embodiment one, the only difference is Step 903, where Step 903 changes to Step 903*b*:

Step 903*b*: if the random number generated in Step 901 is less than the probability factor comprised in MBMS access information, the UE initiates cell update procedure, i.e. the UE sending cell update message to UTRAN, and then, if the UE receives cell update confirm returned from UTRAN, the UE stops receiving further MBMS access information in the modification period; otherwise, the UE has not received the cell update confirm returned from UTRAN in preset time, then going to Step 904.

Embodiment Four

In this embodiment, upon receiving certain MBMS access information message and passing probability factor checking of activated MBMS service in a modification period, the UE in idle mode initiates RRC connection setup procedure, and then upon receiving RRC connection setup message and implementing mode transfer successfully, the UE stops acquiring further MBMS access information in the modification period. Comparing the procedure of the UE in idle mode in embodiment four with those in embodiment one, the only difference is Step 803, where Step 803 changes to Step 803*c*:

Step 803*c*: if the random number generated in Step 801 is less than the probability factor comprised in MBMS access information, the UE initiates RRC connection setup procedure, i.e. the UE sending RRC connection request to UTRAN, and then upon receiving RRC connection setup message returned from UTRAN, the UE resolves corresponding information in the message, the message containing at least the message that can indicate state of UE transfer, upon transferring from idle mode to RRC connected mode according to the resolved information, the WE stops receiving further MBMS access information in the modification period; otherwise, if the UE fails to transfer to RRC connected mode, then going to Step 804.

Upon receiving certain MBMS access information and passing probability factor checking of activated MBMS service in a modification period, the UE in URA_PCH state initiates cell update procedure, and then upon receiving cell update confirm and implementing state transfer successfully, the UE stops acquiring further MBMS access information in the modification period. Comparing the procedure of the UE in URA_PCH state in embodiment four with those in embodiment one, the only difference is Step 903, where Step 903 changes to Step 903*c*:

Step 903*c*: if the random number generated in Step 901 is less than the probability factor comprised in MBMS access information, the UE initiates cell update procedure, i.e. UE sending cell update message to UTRAN. Upon receiving cell update confirm from UTRAN, the UE resolves corresponding information in the confirm message, the message contains at least the message that can indicate state of UE transfer, for instance, indicating that the UE has transferred from URA_PCH state to CELL_PCH, or indicating that the UE remains URA_PCH state; upon transferring from URA_PCH state to CELL_PCH state or URA_PCH state according to the resolved information, the UE stops receiving further MBMS access information in the modification period; otherwise, if the UE fails to transfer to CELL_PCH state or URA_PCH state, then going to Step 904.

Embodiment Five

Generally, before the UE initiating relevant procedure, MBMS access information issued by RNC comprises probability factor of MBMS service activated by the UE, However, when the MBMS access information issued by RNC does not comprise probability factor of MBMS service activated by the UE, once the UE successfully responds MBMS access information, it can also initiate corresponding procedures and stop acquiring MBMS access information.

Figure 10:
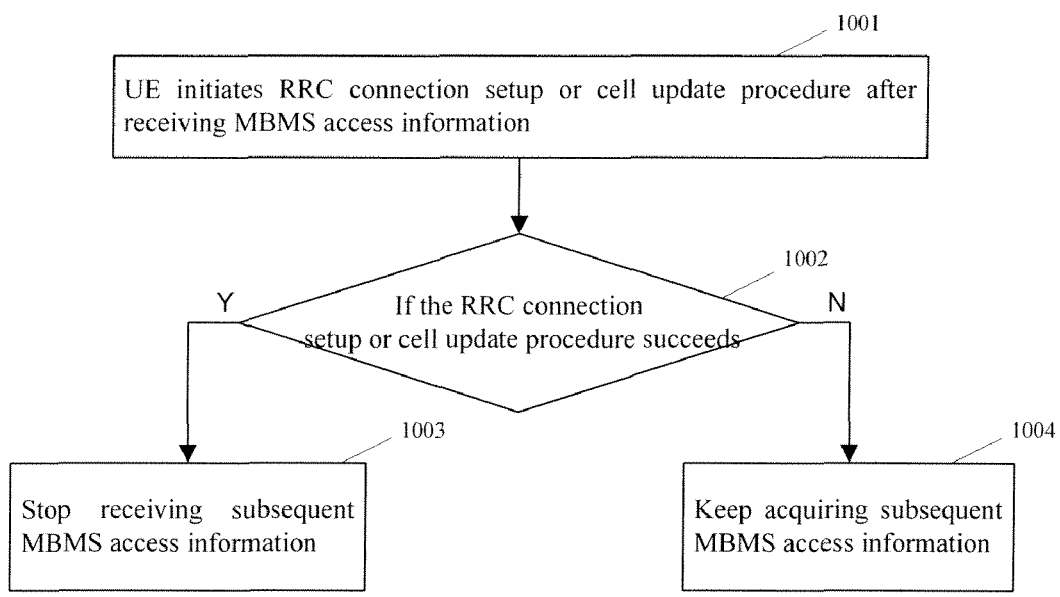
FIG. 10 is a schematic diagram illustrating implementing procedure of another embodiment of the invention.

Upon receiving the access information ill a modification period, the UE in idle mode initiates RRC connection setup procedure, moreover, upon successfully initiating RRC connection setup procedure, the UE stops acquiring further access information messages in the modification period. Wherein, the detailed procedure refers to Step 1001~1004 in FIG. 10:

Upon receiving MBMS access information sent from RNC, the UE initiates RRC connection setup procedure, and then judging whether the RRC connection setup procedure is successfully implemented, if yes, the UE stops acquiring further MBMS access information in the modification period; otherwise, continues acquiring further MBMS access information in the modification period.

Wherein, the implementing RRC connection setup procedure successfully means: the RCC connection request message returned from Medium Access Control (MAC) layer of the UE having been sent successfully; or the UE receiving RRC connection setup message sent from UTRAN; or the UE having been transferred to RRC connected mode successfully.

Once receiving access information in a modification period, the UE in URA_PCH state initiates cell update procedure, moreover, upon successfully implementing cell update procedure, the UE stops acquiring further access information messages in the modification period. Wherein, the detailed procedure refers to Step 1001~1004 in FIG. 10:

Upon receiving MBMS access information sent from RNC, the UE initiates cell update procedure, and then judging whether the cell update procedure is successfully implemented, if yes, the UE stops acquiring further MBMS access information in the modification period; otherwise, continues acquiring further MBMS access information in the modification period.

Wherein, the implementing cell update procedure successfully means: the cell update message returned from MAC layer of the UE having been sent successfully; or the UE receiving cell update confirm message sent from UTRAN; or the UE having been transferred to CELL_PCH state or URA_PCH state successfully.

The only difference between embodiment five and embodiment two to four is: in embodiment five, it is not necessary to generate a random number upon UE receiving MBMS access information, and the MBMS access information acquired by the UE can comprise no probability factor. Or the MBMS access information acquired by the UE comprises probability factor, but the UE does not generate any random number, and implements no checking and procedure on probability factor comprised in MBMS access information.

Based on the above embodiments, before continuing acquiring the further MBMS access information in the modification period, the method further comprises; judging whether the current modification period has ended, if yes, stop acquiring MBMS access information; otherwise, continue acquiring the further MBMS access information in the modification period; or it can comprise: judging whether the received MBMS access information comprising access information of MBMS service activated by the UE, if not, stops acquiring MBMS access information; otherwise, continues acquiring the further MBMS access information in the modification period; or it can comprise a combination of these two judging results.

The above schemes are applicable to wireless communication systems such as GPRS, EDGE, WCDMA and TD-SCDMA etc., and the above description is just the preferable embodiments of the invention and should not be used to confine the protection scope thereof.

The invention claimed is:

1. A method for acquiring Multimedia Broadcast/Multicast Service (MBMS) access information, comprising:
   in a modification period of MBMS Point to Multipoint Control Channel (MCCH) information, upon receiving an MBMS access information transmitted from a network, a User Equipment (UE) initiating a responding procedure to respond to the MBMS access information according to current state of the UE; and
   the UE judging whether the UE responds to the MBMS access information successfully, if yes, the UE stopping receiving further MBMS access information in the modification period of MCCH information; if not, the UE continuing acquiring further MBMS access information in the modification period of MCCH information;
   wherein the MBMS access information transmitted from network comprises a probability factor for the MBMS activated by the UE; before the UE initiating the responding procedure, further comprising:
   upon receiving the MBMS access information that comprises the probability factor, the UE generating a random number uniformly distributed within [0, 1]; and judging whether the generated random number satisfies an assigned initiating condition, upon comparing the generated random number with the probability factor comprised in the MBMS access information, if yes, the UE initiating the responding procedure according to the state of the UE, if not, the UE continuing acquiring the further MBMS access information in the modification period.

2. The method according to claim 1, wherein if the UE is in an idle mode,
   the step of initiating the responding procedure comprises: the UE initiating a Radio Resource Control (RRC) connection setup procedure; and
   the step of judging whether the UE responds to the MBMS access information successfully comprises one of the four following procedures:
   the UE judging whether the UE has sent a RRC connection request to the network, if yes, considering that the UE responds to the MBMS access information successfully, if not, considering that the UE fails to respond to the MBMS access information;
   the UE judging whether the RRC connection request has been successfully sent to the network according to instructions returned from MAC layer of the UE, if yes, considering that the UE responds to the MBMS access information successfully, if not, considering that the UE fails to respond to the MBMS access information;
   the UE judging whether it has received the RRC connection setup sent from the network, if yes, considering that the UE responds to the MBMS access information successfully, if not, considering that the UE fails to respond to the MBMS access information; and
   the UE judging whether it has successfully transferred into the RRC connected mode, if yes, considering that the UE responds to the MBMS access information successfully, if not, considering that the UE fails to respond to the MBMS access information.

3. The method according to claim 1, wherein if the UE is in a URA_PCH state of the RRC connected mode,
   the step of initiating the responding procedure comprises: initiating a cell update procedure;
   the step of judging whether the UE responds to the MBMS access information successfully comprises one of the four following procedures:
   the UE judging whether the UE has sent the cell update message to the network, if yes, considering that the UE responds to the MBMS access information successfully, if not, considering that the UE fails to respond to the MBMS access information;
   the UE judging whether a cell update message has been successfully sent to the network according to instructions returned from its MAC layer of the UE, if yes, considering that the UE responds to the MBMS access information successfully, if not, considering that the UE fails to respond to the MBMS access information;
   the UE judging whether it has received the cell update confirmation sent from the network, if yes, considering that the UE responds to the MBMS access information successfully, if not, considering that the UE fails to respond to the MBMS access information; and
   the UE judging whether it has been successfully transferred into the CELL_PCH state or the URA_PCH state, if yes, considering that the UE responds to the MBMS access information successfully, if not, considering that the UE fails to respond to the MBMS access information.

4. The method according to claim 1, wherein the assigned initiating condition comprises: the generated random number is greater than the probability factor comprised in the MBMS access information; or the generated random number is less than the probability factor comprised in the MBMS access information.

5. The method according to claim 1, wherein before continuing acquiring the further MBMS access information in the modification period, the method further comprises one or two of the two following judgment procedures:
   judging whether the current modification period has ended, if yes, stopping acquiring the further MBMS access information; if not, continuing acquiring the further MBMS access information in the modification period; and judging whether the received MBMS access information comprises access information of the MBMS activated by the UE, if not, stopping acquiring the further MBMS access information; if yes, continuing acquiring the further MBMS access information in the modification period.

6. The method according to claim 1, wherein the network comprises General Packet Radio Service (GPRS) network, Enhanced Data rates for GSM Evolution (EDGE) network, Wideband Code Division Multiple Access (WCDMA) network or Time-Division Synchronization Code Division Multiple Access (TD-SCDMA) network.

\* \* \* \* \*